United States Patent [19]
Graeff et al.

[11] Patent Number: 6,125,159
[45] Date of Patent: Sep. 26, 2000

[54] CANOPY SEAL CLAMP ASSEMBLY AND METHOD OF INSTALLATION

[75] Inventors: Kurt R. Graeff; Kenneth A. Martin, both of Windsor, Conn.

[73] Assignee: CE Nuclear Power LLC, Windsor, Conn.

[21] Appl. No.: 09/226,125

[22] Filed: Jan. 7, 1999

Related U.S. Application Data

[60] Provisional application No. 60/084,906, May 11, 1998.

[51] Int. Cl.[7] .......................... G21C 13/00; G21C 13/028
[52] U.S. Cl. .......................... 376/204; 376/203; 376/205
[58] Field of Search .................. 376/203–205, 376/234, 239, 245, 350, 406, 415

[56] References Cited

U.S. PATENT DOCUMENTS

| | | | |
|---|---|---|---|
| 4,480,841 | 11/1984 | Schukei et al. | 277/1 |
| 4,611,813 | 9/1986 | Guerrero | 277/1 |
| 4,655,483 | 4/1987 | Margotta | 285/169 |
| 4,676,573 | 6/1987 | Norman | 439/318 |
| 4,709,729 | 12/1987 | Harrison | 138/99 |
| 4,723,795 | 2/1988 | Shenoy | 285/138 |
| 4,826,217 | 5/1989 | Guerrero | 285/158 |
| 4,834,935 | 5/1989 | Daigel et al. | 376/292 |
| 5,316,319 | 5/1994 | Suggs | 277/106 |
| 5,323,428 | 6/1994 | Porter et al. | 376/204 |
| 5,513,227 | 4/1996 | Margotta et al. | 376/203 |
| 5,605,361 | 2/1997 | Sims | 285/206 |
| 5,619,546 | 4/1997 | Porter et al. | 376/204 |
| 5,631,936 | 5/1997 | Theroux et al. | 376/204 |
| 5,918,911 | 7/1999 | Sims | 285/13 |

FOREIGN PATENT DOCUMENTS

| | | |
|---|---|---|
| 0266211 | 4/1988 | European Pat. Off. . |
| 479015 | 9/1969 | Switzerland . |

*Primary Examiner*—Charles T. Jordan
*Assistant Examiner*—Jack Keith
*Attorney, Agent, or Firm*—Ronald P. Kananen; Henry T. Crenshaw; Rader, Fishman & Grauer

[57] ABSTRACT

A canopy seal clamp assembly (40) for stopping leaking in a canopy seal weld (42) located between a nuclear reactor vessel nozzle (30) and an elongated housing (24) includes an upper plate (44) having a central aperture (50) and an inner flange (52) spaced apart from a lower plate (60) having a central aperture (66) and an inner flange (68), a seal carrier (70) located adjacent the lower plate carriers a seal (72) for contacting an outer surface of a leaking weld (42) and connector (56) between the upper and lower plate maintain a compressive load to tightly seal the leaking weld and the compressive load tends to close and arrest further crack propagation in the weld. A method for repairing a weld is also described.

12 Claims, 4 Drawing Sheets

CANOPY SEAL CLAMP ASSEMBLY AND METHOD OF INSTALLATION

CROSS REFERENCE TO RELATED APPLICATION

The subject matter of the present application relates to applicants' co-pending Provisional U.S. patent application Ser. No. 60/084,906, filed May 11, 1998 (Docket No.: C980360) and co-pending U.S. patent application Ser. No. 09/070,846 which was filed on or about May 1, 1998.

FIELD OF THE INVENTION

The present invention relates to nuclear power reactors and, in particular, to a seal clamp assembly and method for repairing a leaking weld located between a nuclear reactor vessel nozzle and an elongated housing.

BACKGROUND OF THE INVENTION

The present invention relates to nuclear power reactors, and more particularly, to a method and apparatus for sealing leaking welds on the head of a nuclear reactor vessel.

On typical pressurized water nuclear reactors, a plurality of control rod drive mechanisms (CRDM) are mounted on the vessel head. The mechanisms are located in pressure boundary housings and provide controlling motion to the neutron absorbing control rods. The components which make up the housings are assembled to each other and joined with omega sealed welds. A canopy seal omega weld is located between a reactor vessel head nozzle and a mating part (see FIG. 1). The weld has a tendency to develop cracks as a result of stress corrosion cracking. These cracks typically propagate through the weld until leakage occurs.

It is common to have reactor vessel head nozzles located at every potential control rod position. A majority of the nozzles are used for control rods, a smaller number of nozzles are used for core-exiting thermocouple instrumentation and several other nozzles (spares) are capped. canopy seal omega weld leaks have been fixed by shutting down the nuclear plant, draining the reactor coolant to a level below the reactor vessel head and applying a weld overlay to the leaking location. Such a process takes a large amount of time, gives the workers a large dose of radioactivity due to the close proximity and contact with the reactor vessel head, and is no different in structure than the existing weld. Thus, leakage could occur again in the same location.

SUMMARY OF THE INVENTION

The present invention provides a canopy seal clamp assembly (CSCA) as a non-welded mechanical method and device for stopping leaking in a canopy seal weld. The CSCA seals the leaking weld and introduces a compressive load into the canopy seal, which tends to close and arrest the crack propagation. The CSCA seals the leaking weld by compressing a Grafoil seal over the entire annular canopy seal weld area.

The canopy seal clamp assembly has three major advantages over weld repair options, in that it will save time, radiation dosage, and reoccurrence of the leak.

A distinct advantage of the CSCA over the weld repair options is that installation can be completed without "draindown" of the reactor coolant system. This is a major advantage, because the majority of leaks are found during plant start-up after an outage. For the best weld repair, it is required that there be no water (or moisture) in the nozzle. Therefore, time is saved by not having to "draindown" for repair.

The CSCA will also save radiation dosage. The weld repair requires a crew to be within close proximity with the reactor vessel head nozzles (high does area), for a comparable amount of time. The CSCA is installed from the top of the reactor vessel head lift rig (much lower does area), with long handle tools. Therefore, the CSCA worker receives a smaller amount of radiation dosage than that worker doing a weld repair.

A leak is less likely to reoccur on a nozzle that has been repaired with a CSCA, than a nozzle that has been weld repaired. This is because the CSCA introduces a compressive load into the canopy seal, which tends to close and arrest the crack propagation. The weld repair is no different than the weld that previously exists. Therefore, the CSCA repairs the leak, and prevents future leaks from occurring.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
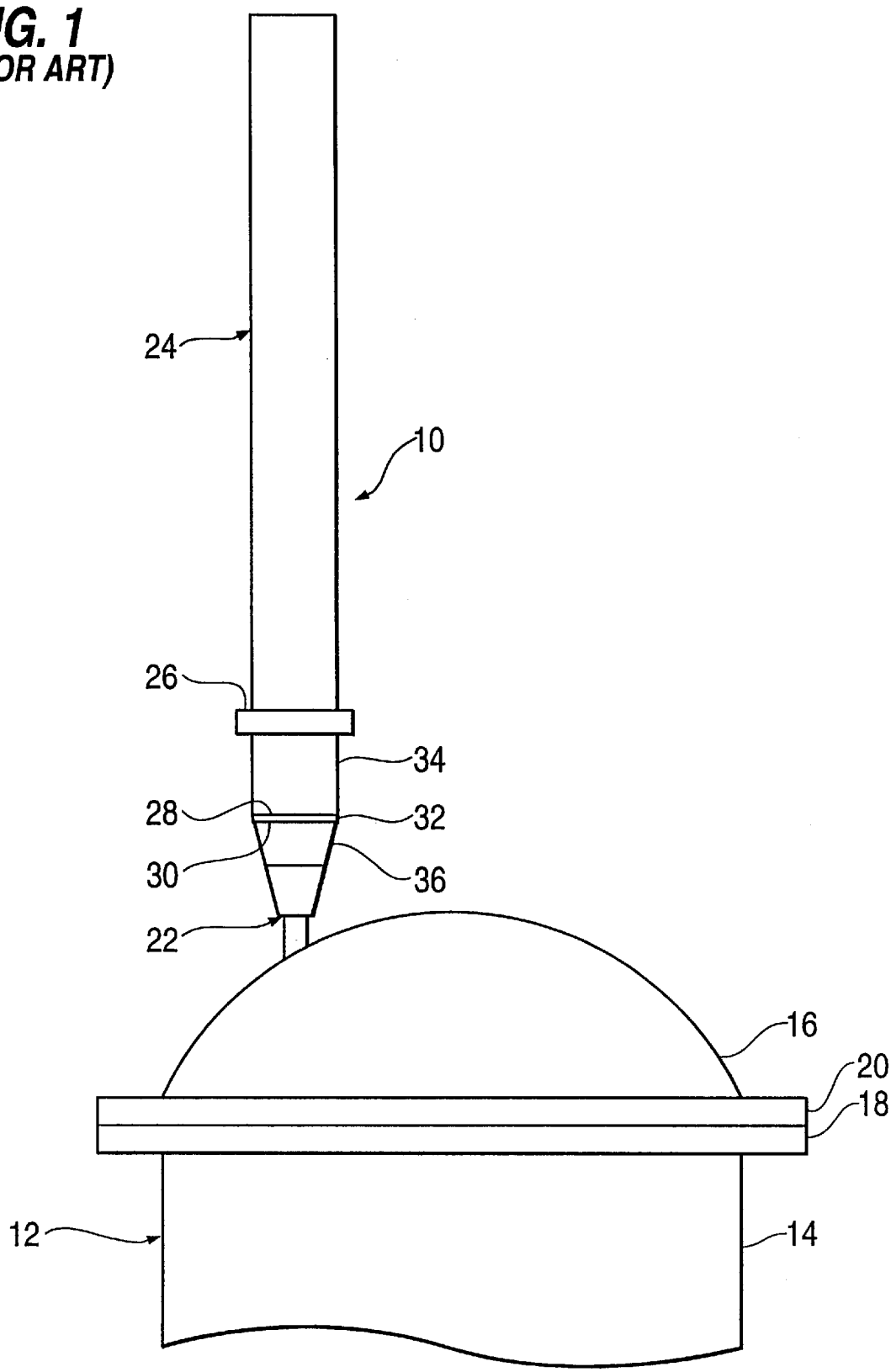
FIG. 1 is a prior art schematic elevation view of the upper portion of a nuclear reactor vessel, showing a control rod drive mechanism housing connected to a reactor vessel nozzle extending from the reactor vessel head.

FIG. 1 shows a portion of a nuclear reactor system 10 having a reactor 12 including a substantially upright cylindrical vessel 14 and a substantially semi-hemispherical head 16. The vessel has an upper flange 18 and the head 16 has a lower flange 20 which are bolted together in a known manner for normal operation of the reactor system 10. As is well known in the field of nuclear engineering, the nuclear power generated in the reactor can be controlled by the increase or decrease in the amount of neutron absorbing material that is inserted into or withdrawn from the core in the vessel 14. This is typically accomplished by a plurality, normally at least several control rod clusters or assemblies (not shown) each of which pass through a nozzle such as 22. For the purpose of simplifying the present description, only one of the reactor vessel nozzles 22 in the head 16 is shown, but it should be appreciated that normally there are at least as many nozzles 22 as control rod assemblies to be moved into and out of the vessel 14 during operation. Each control rod assembly is housed in a control rod drive mechanism housing 24, which has an associated motor (not shown) for effecting movement of the control rods. The control rod drive housing 24, control rod assemblies, and associated motor are in all respects conventional and form no part of the present invention.

Conventionally, the control rod drive housings 24 include a circumferential shoulder or flange 26 near the housing lower portion 34, which is adapted to mate with the nozzle upper portion 36. Specifically, the housing lower end 28 confronts the nozzle upper end 30, with the confronting ends carrying an omega or canopy seal structure welded to establish a circumferential weld line 32. In the field, the housings 24 are densely packed together and provide minimal area for weld repair.

Figure 2:
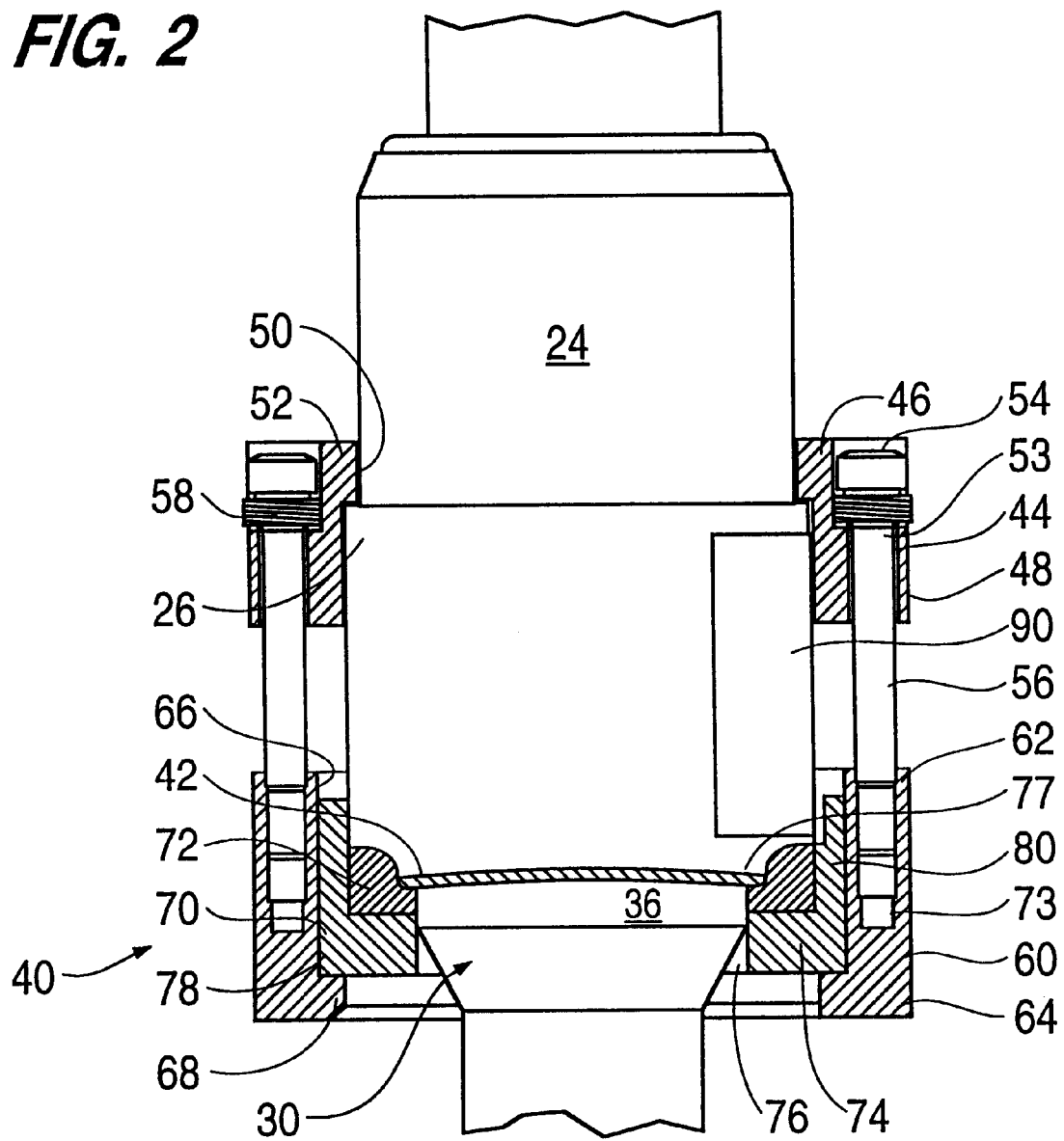
FIG. 2 is a cross-section view of a seal clamp assembly according to the present invention.

FIG. 2 shows a seal clamp assembly 40 for preventing and/or repairing a leaking weld 42. The seal clamp assembly 40 includes an upper plate 44 having a top portion 46 and a bottom portion 48 and further including a central aperture 50 for allowing control rod drive mechanism housing 24 to pass therethrough. An inner flange 52 extends radially inwardly to abut the shoulder 26 of the control rod drive housing 24. Preferably, inner flange 52 is located in top portion 46 of upper plate 44. In general, upper plate 44 has an annular shape including a generally inverted L-shaped cross-section. A series of circumferentially spaced bores 53 having recesses 54 are provided in upper plate 44 to accommodate fasteners 56 and belleville washers 58.

Seal clamp assembly 40 also has a lower plate 60 having a top portion 62 and a bottom portion 64. Additionally, a central aperture formed by 66 and 68 is sufficiently large and has a diameter greater than the diameter of shoulder 26 to permit lower plate 60 to be lowered past shoulder 26 to a position near weld 42. Lower plate 60 has an inner flange 68 extending radially inwardly and formed in bottom portion 64. Lower plate 60 is generally annular and has a generally L-shaped cross-section. Next, a seal carrier 70 is provided for carrying a seal 72 and is designed to abut lower plate inner flange 68. Lower plate 60 further includes a series of circumferentially spaced apertures 73 that are preferably threaded to retain connectors 56 and effect a clamping load on seal 72. Seal carrier 70 includes an inner flange 74 extending radially inwardly and has a central aperture 76 to allow nozzle upper end 30 to pass therethrough. However, because seal carrier central aperture 76 has a diameter smaller than shoulder 26, seal carrier 70 is formed in first and second halves 78, 80. Seal 72 is preferably a split ring seal to permit seal 72 to be installed around a shoulder 77 of nozzle upper portion 36 and contact weld 42 without disassembly of control rod drive mechanism housing 24 from nozzle upper portion 36. Seal 72 can be made of any suitable material including GRAFOIL® grade (available from the Union Carbide Company). However, any suitable material can be used such that seal 72 is able to prevent leaking of weld 42. As connectors 56 are tightened, seal 72 is placed under compression to tightly engage an exterior surface of weld 42 and surrounding surfaces adjacent weld 42 to sealingly engage those surfaces and prevent further leakage past weld 42.

Figure 3:
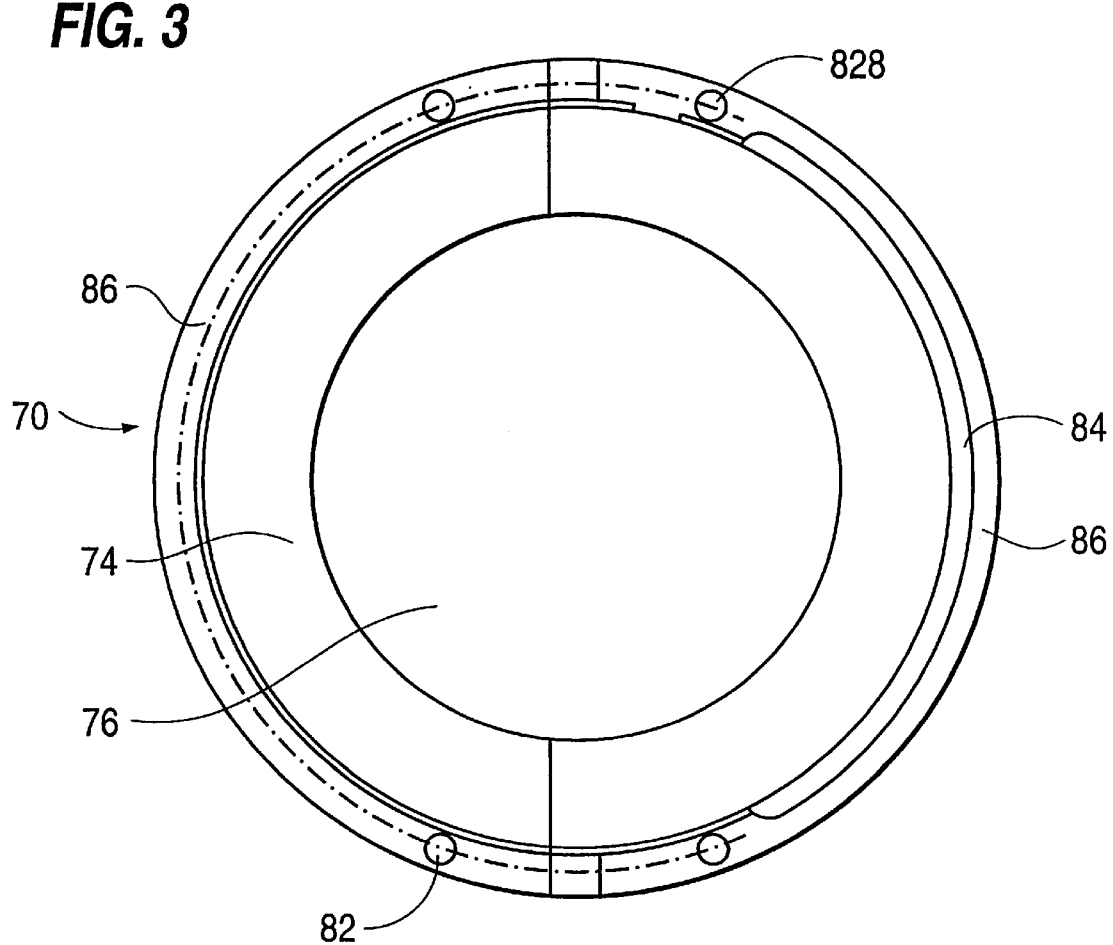
FIG. 3 shows a top view of a seal carrier for use with the present invention.

FIG. 3 shows a top view of seal carrier 70 including central aperture 76 and a plurality of circumferentially spaced apertures 82 for receiving guide rods used in initially positioning and delivering seal carrier 70 to its desired position adjacent weld 42. An arc-shaped recessed portion 84 is formed in an upper portion of a side wall 86 of seal carrier 70. Arc-shaped cut-out portion 84 is formed to permit viewing of a label 90 located on control rod drive mechanism housing 24 and eliminate interference of seal carrier 70 with label 90.

Figure 4:
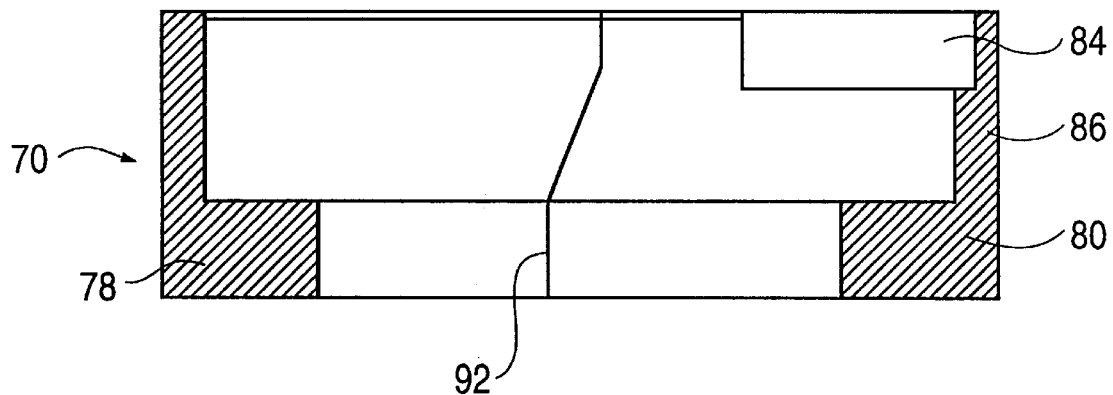
FIG. 4 shows a cross-sectional elevational view of the seal carrier of FIG. 3.

FIG. 4 shows an elevational cross-sectional view of seal carrier 70 having first and second halves 78, 80 including a parting line 92. Recessed portion 84 is shown located in the upper portion of side wall 86 in the right hand side of the FIG.

Figure 5:
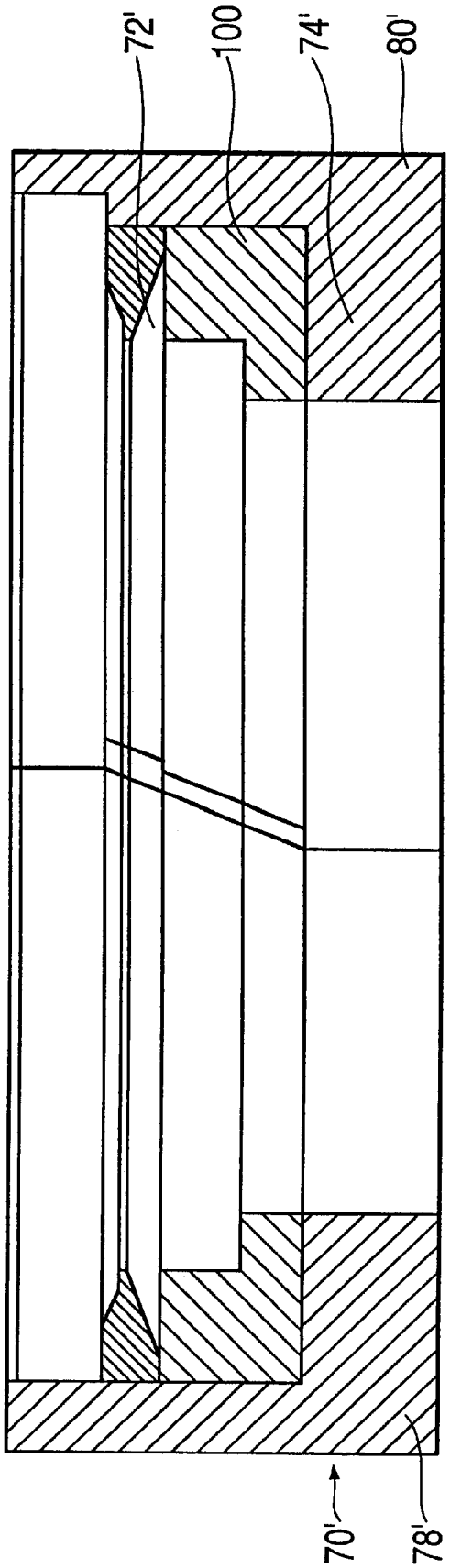
FIG. 5 is a cross-section elevational view of a seal carrier and seal according to a further embodiment of the present invention.

FIG. 5 shows a further embodiment of a seal carrier 70' having first and second halves 78', 80' and including a split seal 72' positioned above a seal spacer 100. Seal spacer 100 has a predetermined height to raise seal 72' a predetermined distance above seal carrier inner flange 74'. Seal 72' is generally thinner than seal 72 reducing material cost. Spacer 100 allows more precise adjustment to position seal 72' at the site of a leaking weld. In addition, different sized seal spacers can be interchanged to accommodate different configurations of control rod drive mechanism housings 24 and nozzle upper portions 36.

Next, the method of installing a seal clamp assembly will be discussed. After determining that a particular weld located between a nuclear reactor vessel nozzle and a control rod drive mechanism housing is leaking, a cleaning procedure is performed using a wire brush to clean an exterior surface of the leaking weld to ensure a smooth, clean surface and eliminate any dirt or contaminate including boric acid. Next, a plurality of elongated guide rods approximately forty feet in length are positioned adjacent the nuclear reactor nozzle. Lower plate 60 is lowered down to the vessel nozzle from a safe distance above the reactor vessel to reduce exposure of maintenance personnel. Lower plate 60 is guided by the elongated guide rods as it is lowered into position. Next, respective halves of seal carrier 70 are placed in position above the lower plate 60 and split seal 72 is also inserted around the reactor vessel nozzle upper portion 36 and seal 72 is positioned on inner flange 74 of seal carrier 70. Then upper plate 44 is lowered to a working position above both the lower plate 60 and the seal carrier 70. Upper plate 44 is guided by elongated guide rods and engages shoulder 26 of control rod drive mechanism housing 24. Connectors 56 are then installed to positively connect upper and lower plates 44, 60 and when connectors 56 are tightened, seal 72 is compressed tightly against the exterior surface of weld 42 and adjacent areas for preventing further leakage of the weld. In addition, the compression loading of seal clamp assembly 40 tends to close the fracture which caused the leak in the weld. Therefore, seal clamp assembly 40 prevents leakage two ways—by resealing the exterior weld surface and compressing the weld fracture together.

To accommodate the lateral insertion of the seal carrier 70 and seal 72, lower plate 60 is lowered below weld 42 to permit sufficient clearance. Once seal carrier 70 and seal 72 are in position, lower plate 60 is raised upwardly such that lower plate inner flange 68 abuts seal carrier 70 and maintains the seal carrier in position. To fully load the seal clamp assembly, a high pressure unit can be used and the plurality of connectors 56 can be tightened appropriately while the clamp assembly is being fully loaded. In this way, a very tight seal clamp assembly 40 is installed over a leaking weld 42 at a distance of approximately forty feet above a reactor vessel nozzle upper portion 46.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A seal clamp assembly for repairing a leaking weld located between a nuclear reactor vessel nozzle and an elongated housing, said seal clamp assembly comprising:

an upper plate having a top portion and a bottom portion, said upper plate including a central aperture with a first inner flange;

a lower plate having a top portion and a bottom portion said lower plate including a central aperture with a second inner flange;

at least one connector extending between said upper and lower plates located near outer peripheries thereof;

a seal carrier abutting said lower plate for transferring a clamping load from said lower plate to said seal carrier, said seal carrier including a third inner flange and an arcuate recess on a portion of the third inner flange for permitting viewing of indicia located on the elongated housing; and a seal for contacting an outer surface of the leaking weld to prevent leakage.

2. The seal clamp assembly of claim 1, wherein said seal carrier abuts said lower plate.

3. The seal clamp assembly of claim 2, wherein said seal carrier has an outer surface designed for complementary mating engagement with said inner flange.

4. The seal clamp assembly of claim 1, wherein said seal carrier has a generally L-shaped cross-section.

5. The seal clamp assembly of claim 1, wherein said lower plate has a generally L-shaped cross-section.

6. The seal clamp assembly of claim 1, wherein said upper plate has a generally inverted L-shaped cross-section.

7. The seal clamp assembly of claim 1, wherein said seal carrier includes first and second separable halves for facilitating installation adjacent the nuclear reactor vessel nozzle.

8. The seal clamp assembly of claim 1, wherein said at least one connector is a plurality of circumferentially spaced apart fasteners.

9. In combination, a nuclear reactor vessel nozzle connected to an elongated housing and having a leaking weld located therebetween and a seal clamp assembly for repairing the leaking weld, the combination comprising:

a first shoulder located on said elongated housing;

a second shoulder located on said reactor vessel nozzle;

a weld for sealing said elongated housing to said reactor vessel nozzle;

an upper plate having a top portion and a bottom portion, said upper plate including a central aperture with a first inner flange for abutting said first shoulder;

a lower plate having a top portion and a bottom portion, said lower plate including a central aperture with a second inner flange for abutting said second shoulder;

a plurality of connectors extending between said upper and lower plates located near outer peripheries thereof;

a seal carrier abutting said lower plate for transferring a clamping load from said lower plate to said seal carrier, said seal carrier including a third inner flange an arcuate recess on a portion of the third inner flange for permitting viewing of indicia located on the elongated housing; and a seal for contacting an outer surface of the leaking weld to prevent leakage.

10. The combination of claim 9, wherein said seal carrier includes first and second separable halves for facilitating installation adjacent the nuclear reactor vessel nozzle.

11. The combination of claim 9, wherein said plurality of connectors are circumferentially spaced apart fasteners.

12. The combination of claim 9, wherein said seal is a split seal to facilitate assembly around said weld without requiring disassembly.

* * * * *